United States Patent Office 3,267,163
Patented August 16, 1966

3,267,163
PROCESS FOR THE CHLORINATION OF ACETYLENE
Shigeru Tsutsumi, Hirakata-shi, Osaka, and Yukiya Sakamoto, Aichi-gun, Aichi-ken, Japan, assignors to Toa Gosei Kagaku Kogyo Kabushiki Kaisha, Tokyo, Japan
No Drawing. Filed Mar. 8, 1961, Ser. No. 94,157
Claims priority, application Japan, Mar. 11, 1960, 35/7,471
1 Claim. (Cl. 260—660)

This invention relates to a new process for the chlorination of acetylene and more particularly to a process for the chlorination of acetylene, characterized in that acetylene, ethylene and chlorine are introduced into an organic solvent containing a catalyst and thus the acetylene in the state of being mixed with the ethylene is chlorinated in said solvent.

The object of the present invention is to produce tetrachloroethane in good yield and with advantage by effecting the liquid-phase chlorination of acetylene and of ethylene simultaneously and thus performing the liquid-phase chlorination of acetylene at a lower temperature and at a higher velocity of reaction than those usually employed, even if the acetylene to be reacted is in a diluted condition.

Before the process of the invention is explained in detail, the starting materials used for the prior synthesis of tetrachloroethane are now described in brief.

Hitherto, the synthesis of tetrachloroethane is almost carried out by reacting the acetylene which has been produced from the reaction of calcium carbide and water, with a stoichiometric quantity or a slightly excessive quantity of chlorine in an organic solvent containing a catalyst. However, as the petro-chemical industry has been developed in the recent date, the industry is more interested in the utilization of the cracked gas obtained by the thermal cracking and rapid cooling of natural gas, petroleum oil, especially light naphtha fraction and of the cracked gas from higher-boiling hydrocarbon fractions, as cheaper sources of acetylene and ethylene. And the production of dichloroethane and tetrachloroethane from the acetylene and ethylene thus obtained is also attempted. However, the gaseous products obtained from such cracking process contain, in addition to acetylene and ethylene, methane, hydrogen, carbon monoxide, carbon dioxide, ethane and other lower hydrocarbons of 3–6 carbon atoms etc. The acetylene and ethylene are present therein in a very diluted condition of 5–15% by volume, respectively. On utilization of such diluted acetylene and ethylene, therefore, it is generally necessary that the valuable gas constituents such as acetylene and ethylene should be firstly separated from the remaining gases mainly comprising hydrogen, carbon monoxide and other gases by applying a solvent-absorbing method. Under these existing circumstances, therefore, very costly plant equipments and large investment are needed for this separation and concentration process.

We have noticed that the above-mentioned separation and concentration process may be omitted if it is possible to simultaneously synthetise dichloroethane and tetrachloroethane in higher yields by using the diluted acetylene and ethylene present in the cracked gas as such, without effecting such a separation and concentration process. So we have started to research the chlorination of the diluted acetylene.

In general, it has been known that the reaction (1) of acetylene with chlorine for the production of tetrachloroethane and the reaction (2) of ethylene with chlorine for the production of dichloroethane are expressed with the following equations:

(1) $C_2H_2 + 2Cl_2 = C_2H_2Cl_4$
(2) $C_2H_4 + Cl_2 = C_2H_4Cl_2$ and that both the reactions (1) and (2) can take place either in vapour phase or liquid phase. In case the reactions (1) and (2) are carried out in the vapour phase, there are involved disadvantages that the reaction temperature required is higher than in the liquid-phase reaction, that by-production of polychlorides is increased and that control of the reaction heat is more difficult.

Accordingly, the present practice is that the reaction is performed in the liquid phase. For instance, the reaction (1) is usually carried out by using tetrachloroethane as solvent and ferric chloride as catalyst at a reaction temperature of 80–100° C., while the reaction (2) is carried out by using dichloroethane as solvent and ferric chloride as catalyst at a temperature of 40–70° C.

On performance of the research, we have thus made thorough investigation of the liquid-phase reaction and firstly have re-examined each of the reactions (1) and (2). In experiment, we have checked the variation in the reaction velocity against the temperature change while keeping the flow rate of the starting gas, the proportion of the starting gas to chlorine at the same level and using the same solvent, catalyst, reactor and others.

As a result, we have found that, in the case of pure ethylene, its conversion rate amounts to 99.9% at a reaction temperature of 95° C. and also to the same value even at 65° C., while in the case of pure acetylene, the conversion rate is 98.1% at 95° C. but falls down to 48% only at 65° C. Unexpectedly, however, we have discovered a new fact that when a mixture of ethylene and acetylene is subjected to the chlorination in the liquid phase in the substantially same way as mentioned above the conversion rate of the acetylene itself at 65° C. is increased to 96.8% without suppressing the chlorination of the ethylene. The present invention is based on this new fact and has been completed on the basis of this new fact.

The reaction mechanism relating to the present invention is now examined. The under-mentioned equations of the reactions may be assumed. It is considered that since the reaction (A) proceeds more rapidly than the reaction (B), the free radical Cl· formed during the reaction (A) assists the reaction (B) so as to promote the chlorination of acetylene. In other words, it is considered that the chlorination of acetylene is promoted due to the fact that the conversion of acetylene into tetrachloroethane according to the reaction (B) requires the radical reaction to occur twice, while the conversion of ethylene into dichloroethane according to the reaction (A) requires the radical reaction to occur only once; namely that the reaction (B) requires the process of the radical reaction to take place twice as much as the reaction (A), so that the free radical Cl· formed in the reaction (A) is consequently used as a radical source necessary for the reaction (B).

(A)

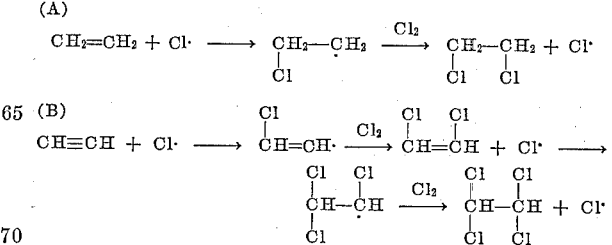

We have found the new fact as described, and, as a result of it, succeeded in the chlorination of acetylene at lower temperature and simultaneously dissolved the troubles of the conventional process as stated below.

(a) The chlorination of acetylene in the liquid phase is usually carried out at 80–100° C. in the conventional process. According to the process of the invention, however, the chlorination may be performed at a considerably lower temperature of reaction so that the by-production of polychlorides such as pentachloroethane, hexachloroethane etc. can be reduced.

(b) When the process of the invention is applied to the cracked gas, the chlorination of acetylene is effected in a higher conversion rate simultaneously with that of ethylene, so that tetrachloroethane is obtained from acetylene and also dichloroethane from ethylene in good yields. As the chlorination of acetylene is then effected at a lower temperature, the by-production of polychlorides is not only prevented but the chlorination of $CO$, $CH_4$, $C_2H_6$, $H_2$ etc. present in said cracked gas is also avoided and chlorine is effectively used. Thus, we have found that the acetylene present in the cracked gas can be chlorinated without being separated and concentrated and also that the separation of dichloroethane and tetrachloroethane so produced, can be performed easily owing to a remarkable difference between their boiling points.

In general, when pure acetylene is chlorinated in the liquid phase in admixture with ethylene according to the process of the invention, this chlorination can be readily practised by using apparatus and procedure which are usually used for the chlorination of pure acetylene or pure ethylene in the liquid phase. But the process of the invention shows a larger merit when applied to the chlorination of the diluted acetylene and ethylene as present in the cracked gas rather than when applied to the chlorination of concentrated gaseous mixture of such a pure acetylene and ethylene admixed.

The cracked gas generally contains amounts of methane, hydrogen, carbon monoxide, carbon dioxide, ethane and other lower hydrocarbons of 3–6 carbon atoms as well as moisture etc., in addition to acetylene and ethylene. If this gas containing the acetylene and ethylene in an amount of 5–15% by volume, respectively as well as moisture is directly chlorinated at a temperature of 50–75° C., the conversion rate of the ethylene is higher but the conversion rate of the acetylene remains at a lower value. In order to enhance the conversion of the acetylene, it needs to carry out a thorough removal of moisture from the cracked gas. It is then necessary that the removal of moisture should be performed to such an extent that the water content of the cracked gas is less than 0.5 g./m.$^3$ and preferably less than 0.2 g./m.$^3$. For the removal of the moisture from the cracked gas, there may be used either a dehydrating agent such as anhydrous calcium chloride and silica gel etc., or the freezing-dehydration method, whereby the removal of moisture can be achieved to a value less than the specific water content.

Furthermore, the hydrocarbons carried along with the cracked gas may sometime contain higher acetylenes, which do not effect the liquid-phase chlorination of the acetylene and ethylene but are desirable to be previously removed off by washing with a solvent such as naphtha, chlorinated hydrocarbons etc., so as to maintain a higher purity of the liquid reaction mixture to be chlorinated.

On the other hand, no difficulty is presented by the chlorine employed, because it is fed from the chlorine-production plant in a dry state after the electroyltically produced raw chlorine gas has been dried with sulfuric acid to reduce its water content to less than 0.2 g./m.$^3$.

The water content of the cracked gas not only represents a trouble in the reduction in the conversion of acetylene as stated in the above, but also involves an important problem with respect to corrosion of apparatus when a reactor made of iron is used for the liquid-phase chlorination.

On carrying out the invention, carbon tetrachloride, tetrachloroethane, dichloroethane and other hardly chlorinated medium may be used as a solvent. Needless to say, however, dichloroethane or tetrachloroethane which is the final product of the process may be conventionally employed as a solvent.

According to the process of the invention, the chlorination reaction can be performed at a temperature considerably lower than those which are usually employed in the chlorination of acetylene and publicly known from the literature, such that it is not only possible to extremely suppress the by-production of pentachloroethane and hexachloroethane which is likely to occur in the chlorination of acetylene at an elevated temperature of 80–100° C., but also it is possible to keep a higher solubility of the acetylene and ethylene in the reaction medium owing to the lowered reaction temperature in carrying out the direct chlorination of a diluted gas such as the cracked gas.

These possibilities also become the factors capable of increasing the conversion rate of each of acetylene and ethylene. Further, the performance of the reaction at the lower temperature also can decrease the quantities of vaporous chlorination products carried along with the waste gas and reduce the volume of the condenser equipped in the reactor.

Whether a concentrated gas or a diluted gas such as the cracked gas containing the acetylene and ethylene at a concentration of about 5–15% by volume, is used, it is possible to carry out the chlorination at a reaction temperature of 50–75° C. and more advantageously at a temperature of 60–70° C. under which the maximum yield of dichloroethane and tetrachloroethane is attained.

On carrying out the invention, it is preferred that the reactor used is generally of a column type made of iron.

The positions of introducing the starting acetylene, ethylene and chlorine into the reactor are to be properly selected. When a chlorinated hydrocarbon is used as a solvent, the inlet for the chlorine is provided near to the bottom of the reactor, and the inlet for the acetylene and ethylene is arranged at the level lower than said chlorine inlet. The reason is that the inlet for the acetylene and ethylene is preferably provided below the chlorine inlet because the chlorine is easily soluble in dichloroethane or tetrachloroethane etc., while the acetylene and ethylene are hardly soluble therein. But, when a system of circulating the liquid reaction mixture is employed in the chlorination reactor for taking off the reaction heat, it is necessary to reverse the above-mentioned positions of the inlets because the medium flows down from the top to the bottom within the reactor.

In order to promote the diffusion of the starting gases introduced into the reactor, there may be provided a device for diffusing the gases. When concentrated acetylene and ethylene are used, the diffusion device needs not be of a special type. When the diluted acetylene and ethylene as in the cracked gas are used, however, it needs to use some effective means such as discharging the starting gases through fine holes, packing with Raschig rings and others so as to improve the diffusion of the gases into the solvent.

The catalyst available in the process of the present invention includes chlorides of iron, antimony, aluminum and other compounds which would be often used for the chlorination of acetylene or ethylene in the liquid phase. Generally, ferric chloride may be preferably used. It is necessary that all of these catalysts is used in anhydrous state.

It is found that both the conversion rates of acetylene and ethylene depend on the concentration of a catalyst used. To insure a higher conversion rate, for instance, the concentration of the catalyst in the solvent should be of order of 0.1–0.3% when using ferric chloride. Iron powder may be sometime used as the catalyst. However, the use of anhydrous ferric chloride would be rather better because it takes a long period of time for iron powder to change into ferric chloride.

On carrying out the process of the invention, the proportion of the ethylene contained in the acetylene may vary. When pure acetylene is employed, it is sufficient for the ethylene to amount to larger than about 20% by weight of the acetylene. Nevertheless, the process of the invention can be expected to have a particular merit when applied to the chlorination of the diluted acetylene and ethylene as in the cracked gas. Thus, the process of the invention permits the direct use of a cracked gas from petroleum oil which is obtained from the thermal cracking of the light naphtha fraction under a reduced pressure as obtained by Tsutsumi's process worked out by one of the present inventors, or other cracked gases obtained from thermal cracking of other hydrocarbons, or the cracked gas which contains the acetylene and ethylene in an amount of 5–15% by volume, respectively. When the cracked gas is used, the total amount of the acetylene and ethylene is generally 15–30% by volume. Referring to the proportion of acetylene: ethylene, it is seen that both the conversion rates of ethylene and acetylene are slightly lower when the cracked gas is rich in ethylene, while both the conversion rates of acetylene and ethylene are slightly higher when the cracked gas is rich in acetylene. There is a tendency that the conversion rate of acetylene is approximately proportional to the concentration of the acetylene.

The quantity of chlorine used in the invention is sufficient, if it is stoichiometric for the chlorination of acetylene and ethylene. When the cracked gas of petroleum oil is used as the starting material, however, it is more preferable that chlorine should be used in an excess of about 5% over the stoichiometric quantity.

Dichloroethane and tetrachloroethane can be easily separated from each other by using a difference between their boiling points. All of them are useful intermediate products; the former is specially useful as a starting material for the manufacture of vinyl chloride which is of wide application and large demand as synthetic resin, and the latter is particularly useful as a starting material for the production of trichloroethylene as an excellent and useful solvent.

By the completion of the present invention, it is possible to convert acetylene and ethylene into tetrachloroethane and dichloroethane, respectively, at such a temperature at which the hydrogen, methane and carbon monoxide present together with the acetylene and ethylene in the cracked gas are not chlorinated. It is also possible that the waste gas containing the hydrogen, methane and carbon monoxide obtained after the direct chlorination of the cracked gas is used as the starting material for the synthesis of ammonia or methanol or as fuel.

The present invention is now illustrated with reference to examples.

*Example 1*

A column-type reactor made of iron and having a capacity of 3.5 l. is charged with 3.8 kg. of dichloroethane as solvent and with 3.8 g. of anhydrous ferric chloride as catalyst. A gaseous mixture of pure acetylene and pure ethylene as well as chlorine is separately bubbled into the reactor from the gas conduits which are provided at the bottom of said reactor and perforated with a number of holes. The conversion rate of acetylene is 96.8% (yield of tetrachloroethane: 94.4%) and the conversion rate of ethylene is 99.9% (yield of dichloroethane: 97.0%) when used a reaction temperature of 65° C., a flow rate of acetylene of 20 l./hr., a flow rate of ethylene of 20 l./hr., and a flow rate of chlorine of 60 l./hr.

*Example 2*

The same conditions and procedure as in Example 1 are used except that a flow rate of acetylene of 20 l./hr., a flow rate of ethylene of 12 l./hr. and a flow rate of chlorine of 52 l./hr. are employed. In this example the converison rate of acetylene is 96.9% (yield of tetrachloroethane: 94.5%) and the conversion rate of ethylene 99.9% (yield of dichloroethane: 97.1%).

*Example 3*

A reactor made of iron and packed with Raschig rings is charged with 4.8 kg. of tetrachloroethane, as solvent, containing 9.6 g. of anhydrous ferric chloride. A gaseous mixture of the starting acetylene and ethylene which has been previously dried on calcium chloride, silica gel and possesses a moisture content of 0.08 g./m.$^3$ and the following composition:

| | Percent by volume |
|---|---|
| Acetylene gas | 21 |
| Ethylene gas | 10 |
| Nitrogen gas | 69 | is then bubbled into the reactor through a number of holes perforated in a gas-inlet conduit which is provided near to the bottom of the reactor. Further, the chlorine which also has been previously dried with sulfuric acid to a moisture content of 0.1 g./m.$^3$ is introduced into the reactor through a chlorine-inlet which is arranged above said inlet conduit for the gaseous mixture.

The conversion rate of acetylene is 96.4% (yield of tetrachloroethane: 95.8%) and the conversion rate of ethylene is 99.7% (yield of dichloroethane: 96.9%) when used a reaction temperature of 64° C., a flow rate of the gaseous mixture of 71 l./hr. and a flow rate of the chlorine of 37 l./hr.

*Example 4*

The same reactor, solvent and catalyst are used as in Example 3. A cracked gas from petroleum oil having the following composition:

| | Percent by volume |
|---|---|
| Nitrogen | 3.4 |
| Carbon monoxide | 28.9 |
| Methane | 7.5 |
| Ethane | 0.3 |
| Carbon dioxide | 4.4 |
| Ethylene | 5.4 |
| Acetylene | 10.4 |
| Hydrogen | 39.7 | and chlorine which both have been previously dried to a moisture content of 0.05 g./m.$^3$ are then bubbled into the solvent. The conversion rate of acetylene is 95.4% (yield of tetrachloroethane: 94.9%) and the conversion rate of ethylene is 99.9% (yield of dichloroethane: 96.1%) when the process is carried out at a reaction temperature of 65° C., a flow rate of the cracked gas of 200 l./hr. and a flow rate of the chlorine of 54 l./hr.

*Example 5*

The chlorination of the same cracked gas as used in Example 4 is carried out under the same conditions as in Example 4, except that the chlorination temperature of 60° C. is used and that the moisture content of the cracked gas is reduced to 0.1 g./m.$^3$ and the moisture content of the chlorine to 0.2 g./m.$^3$. The conversion rate of acetylene is 94.8% (yield of tetrachloroethane: 94.4%) and the conversion rate of ethylene 99.9% (yield of dichloroethane: 96.0%).

The yields of dichloroethane and tetrachloroethane mentioned in the above examples are determined by analysing the reaction products in a gas-chromatography analyser.

We claim:

The process which comprises: introducing a gaseous mixture of acetylene and ethylene whereof the ethylene is present in an amount of at least 20% by volume based on the acetylene, into a solvent of chlorinated hydrocarbons together with chlorine in an amount which is at least stoichiometrically required to chlorinate both the acetylene and ethylene in the mixture to tetrachloroethane and dichloroethane, and at a temperature of 50–75° C., thereby chlorinating the acetylene simultaneously with ethylene.

References Cited by the Examiner

UNITED STATES PATENTS 2,016,572  10/1935  Baumann et al. _____ 260—662
2,973,393  2/1961  Monroe _____ 260—660 XR

FOREIGN PATENTS 559,019  6/1958  Canada.

LEON ZITVER, *Primary Examiner.*

ALPHONSO D. SULLIVAN, *Primary Examiner.*

J. W. WILLIAMS, K. ROCKEY, *Assistant Examiners.*